United States Patent [19]

Trumm

[11] Patent Number: 4,821,807
[45] Date of Patent: Apr. 18, 1989

[54] ROW CROP TILLAGE AND PLANTING UNIT GUIDANCE SYSTEM

[76] Inventor: Eldon E. Trumm, Box 151, Worthington, Iowa 52078

[21] Appl. No.: 873,769

[22] Filed: Jun. 12, 1986

[51] Int. Cl.$^4$ .............................................. A01B 69/06
[52] U.S. Cl. ............................................ 172/6; 172/26; 172/446
[58] Field of Search ............... 172/5, 6, 23, 26, 233, 172/234, 235, 324, 679, 446; 180/131; 104/244.1; 56/10.2, DIG. 5; 200/61.42, 61.44, 153 V, 331, 337; 267/150

[56] References Cited

U.S. PATENT DOCUMENTS

| | | | |
|---|---|---|---|
| 2,402,365 | 6/1946 | Butler | 172/234 |
| 2,441,626 | 5/1948 | Gilpin | 267/150 X |
| 2,929,457 | 3/1960 | Langerak | 172/23 X |
| 3,906,442 | 9/1975 | Mosteller | 200/61.44 X |
| 4,158,390 | 6/1979 | Maschio | 172/5 |
| 4,463,811 | 8/1984 | Winter | 172/26 |
| 4,616,712 | 10/1986 | Jorgensen | 172/6 |

FOREIGN PATENT DOCUMENTS 1366395 6/1964 France .................................. 172/5
562232 8/1978 U.S.S.R. ............................. 172/26

Primary Examiner—Richard T. Stouffer
Attorney, Agent, or Firm—Fleit, Jacobson, Cohn & Price

[57] ABSTRACT

An appaatus is provided for automatically longitudinally shifting a horizontal transverse tool bar and the tillage unit or units supported therefrom relative to the lift hitch of a tractor from which the tool bar is supported responsive to crop row sensing structure sensing misalignment of the tillage unit relative to an associated crop row whereby to reestablish proper alignment of the tillage unit relative to the crop row and the crop row position sensing structure is adjustable for crop row width, elevation of the sensing structure relative to the tillage unit and also in a manner to adapt the crop sensing unit for sensing the stems or stalks of a row crop or opposite sides of an earth ridge in which a row crop is growing or is to be planted.

9 Claims, 3 Drawing Sheets

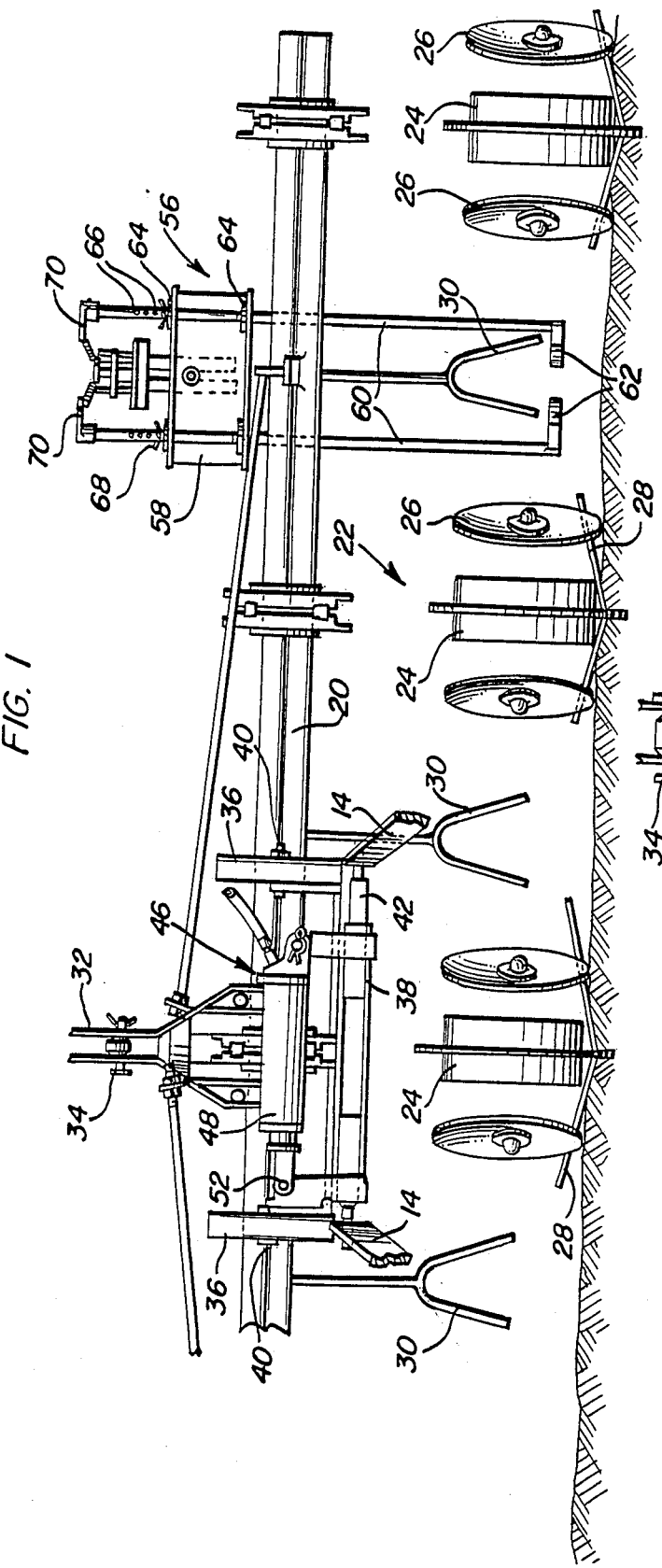
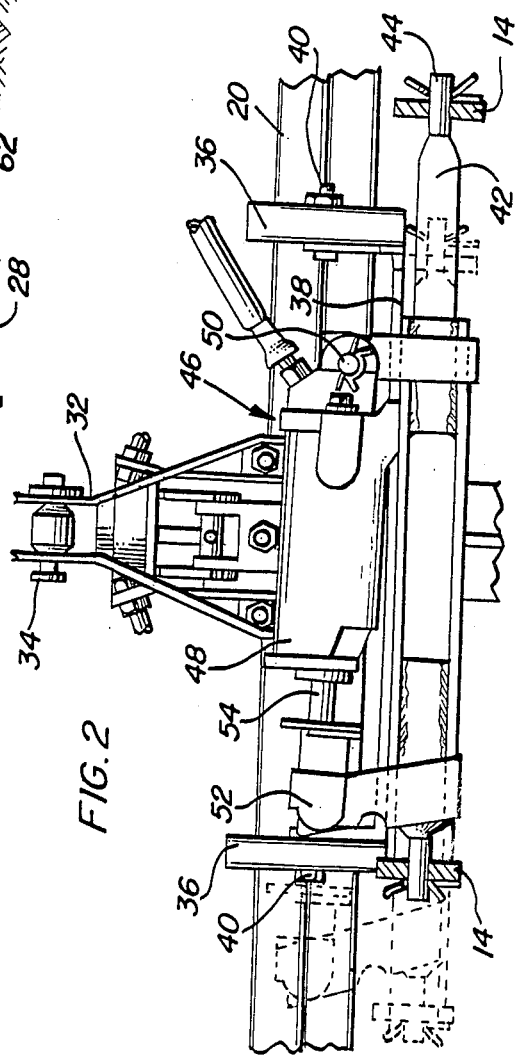
FIG. 1
FIG. 2

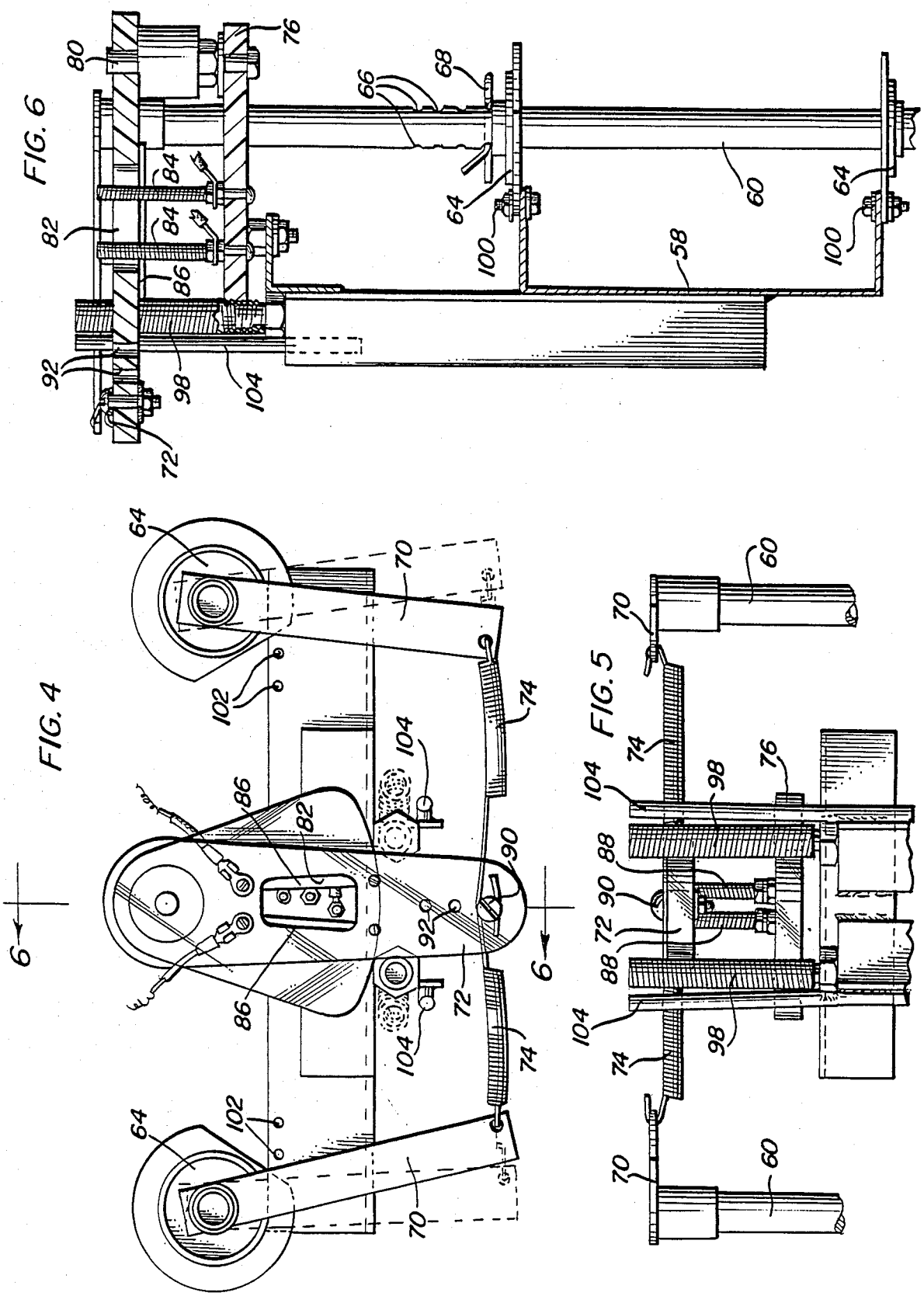

ROW CROP TILLAGE AND PLANTING UNIT GUIDANCE SYSTEM

BACKGROUND OF THE INVENTION

1. Field of the Invention

This invention relates to a row crop tillage unit for mounting from a pair of laterally spaced and rearwardly projecting lower hitch arms of a tractor. The tillage unit is mounted from the rear ends of the hitch arms for lateral shifting relative thereto and incorporates reversible motor structure for adjustably laterally shifting the tillage unit relative to the hitch arms. Crop row sensing structure is operatively associated with the reversible motor structure for actuation thereof in order to shift the tillage unit laterally of the hitch arms in the direction in which the sensing structure senses lateral displacement of a crop row relative to the longitudinal center axis of the associated tractor.

2. Description of Related Art

Various different forms of crop row position sensing control mechanisms heretofore have been utilized in conjunction with crop row tillage units shiftably supported from tractor mounted tool bars. In addition, crop row position sensing structure previously has been provided in operative association with a tractor steering mechanism and laterally shiftable cultivating structure previously has been provided for thinning row crops.

Examples of these various formes of cultivating devices are disclosed in U.S. Pat. Nos. 2,337,646, 2,753,781, 2,929,457, 2,981,355 and 3,955,626.

U.S. Pat. No. 3,955,626, dated May 11, 1976 to Clyde L. Taylor, discloses a tool bar mounted tillage or cultivator units shiftably mounted on the tool bar for adjustable lateral displacement of the units transversely of the associated tractor and along the transverse tool bar from which the tillage units are supported. In addition, the Taylor patent alos discloses center crop row position sensing structure operatively associated with the steering mechanism of the associated tractor whereby the tractor may be precisely steered along a center crop row for cultivation thereof.

However, the Taylor patent structure incorporated special tool bar structure and therefore does not enable a relatively inexpensive crop row tracking mechanism to be incorporated in a multirow tillage unit having a conventional tool bar structure.

SUMMARY OF THE INVENTION

The row crop tillage unit guidance system of the instant invention has been specifically designed for use in conjunction with a tillage unit incorporating a conventional horizontal transverse tool bar and may be used in conjunction with a fully mounted three point hitch supported tool bar assembly or a semi-mounted two arm lift supported tillage unit incorporating a vertically adjustable trail wheel.

The main object of this invention is to provide a multirow crop tillage unit guidance system which may be readily manufactured for use in conjunction with either a three arm or two arm hitch having a conventional tool bar supported therefrom mounting a plurality of crop row tillage assemblies.

Another object of this invention is to provide a row crop tillage unit guidance system in accordance with the preceding object and wherein the guidance system portion of the unit may be readily added to existing conventional row crop tillage units or incorporated into the manufacture of new row crop tillage units.

Another important object of this invention is to provide a row crop tillage unit guidance system constructed in a manner whereby the control for the guidance system may be readily adjusted to height relative to the associated tillage unit.

Another object of this invention is to provide a control for the guidance unit which may be readily adjusted according to the width of a given crop row.

A final object of this invention to be specifically enumerated herein is to provide a crop row tillage unit guidance system in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary front elevational view of a typical multi-row crop tillage unit with which the guidance system of the instant invention has been operatively associated;

FIG. 2 is an enlarged fragmentary elevational view of the upper left-hand portion of FIG. 1;

FIG. 4 is an enlarged top plan view of the crop row position sensing and reversible motor switch actuating mechanism of the guidance system;

FIG. 5 is a fragmentary front elevational view of the assemblage illustrated in FIG. 4;

FIG. 6 is a fragmentary vertical sectional view taken substantially upon the plane indicated by the section line 6—6 of FIG. 4.

DESCRIPTION OF THE PREFERRED EMBODIMENT

Figure 7:
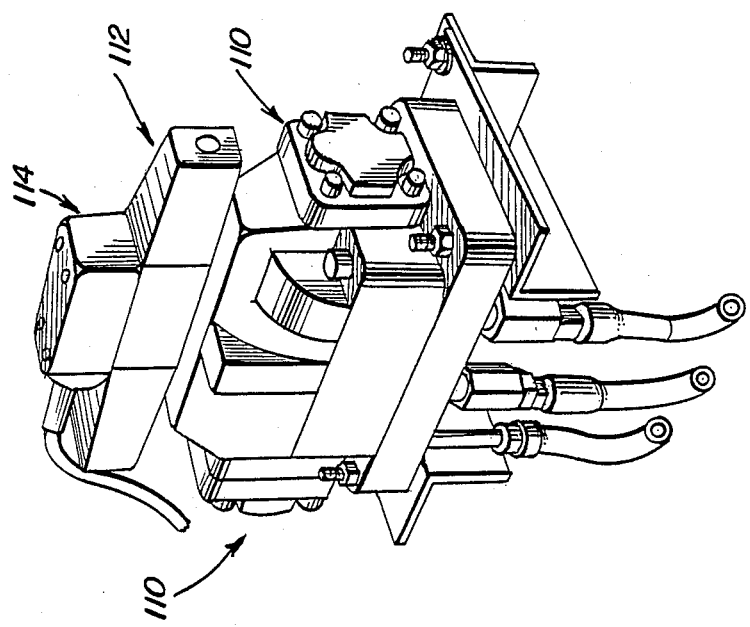
FIG. 7 is a perspective view of the electrically actuated hydraulic valve for the double acting drive cylinder of the guidance system.

Referring now more specifically to the drawings, the numeral 10 generally designates a conventional form of farm tractor including a three point lift hitch referred to in general by the reference numeral 12 and incorporating a pair of opposite side rearwardly projecting lower arms 14 and a central rearwardly projecting upper left arm 16.

A cultivator implement referred to in general by the reference numeral 18 is mounted from the hitch 12 and includes a horizontal transverse tool bar 20 from which a plurality of transversely spaced cultivator units referred to in general by the referene numeral 22 are supported. Each cultivator unit includes a central flange equipped ground engaging support wheel 24, a pair of oppositely angled discs 26, a trailing cultivator sweep 28 and an intermediate row plate shield 30. The cultivator implement comprises a four row implement including four shields 30 spaced between adjacent sets of wheels 24, discs 26 and sweeps 28. The implement 18 additionally includes a longitudinal central upstanding arm assembly 32 supported therefrom including a vertically adjustable universal connection pivot pin 34. A pair of forwardly projecting vertical mounting flanges 36 project forwardly from the tool bar 20 and the rear ends of the lower arms 14 conventionally are pivotally mounted from the mounting flanges.

However, with the instant invention, a horizontally elongated transverse guide assembly 38 is mounted between the flanges 36 by fasteners 40 and slidably and guidingly supports an elongated horizontal transverse mounting bar 42 therefrom including diametrically reduced ends 44 pivotally supported from the rear ends of the lower arms 14.

The guidance system of the instant invention is referred to in general by the reference numeral 46 and includes the guide assembly 38 and the mounting bar 42. In addition, the guidance system 46 includes thrust means in the form of a double acting hydraulic cylinder 48 mounted from the guide assembly 38 as at 50 and anchored relative to the mounting bar 42 as at 52. Accordingly, upon longitudinal extension and retraction of the piston rod 54 of the hydraulic cylinder 48, the tool bar 20 will be shifted to the right and left, respectively, as viewed in FIG. 2.

In addition, a control assembly 56 for the system 46 is provided and is mounted from one of the cultivator units 22 through the utilization of a mounting channel 58. A pair of vertical shafts 60 are oscillatably supported from the channel 58 and include rearwardly convergent lower end sensing arms 62 supported therefrom, see FIG. 1. The shafts 60 are oscillatably supported by upper and lower bearings 64 mounted from the upper and lower flanges of the channel 58 and the upper ends of the shafts 60 include vertically spaced diametric bores 66 formed therethrough, see FIGS. 1 and 6. Stop pins 68 are receivable through selected bores 66 in order to adjust the height of the shafts 60 relative to the corresponding cultivator unit 22. The upper ends of the shafts 60 additionally include a pair of rearwardly convergent control arms 70 supported therefrom and the rear ends of the control arms 70 are interconnected to the free rear end of an oscillatable switch arm 72 disposed therebetween by a pair of closed coil expansion springs 74, see FIGS. 4 and 5. The switch arm 72 is oscillatably supported from a mounting bracket 76 as at 80 and the mounting bracket 76 is in turn supported from the mounting channel 58. The longitudinal midportion of the switch arm 72 is provided with a longitudinal slot 82 and a pair of upstanding closed coil expansion spring contacts 84 have their lower ends mounted from the insulative mounting brackets 76 and their upper ends projecting through the slot 82. A pair of contact bars 86 are mounted from the insulative switch arm 72 and extend along opposite sides of the slot 82. In addition, a pair of upstanding switch arm positioning closed coil expansion springs 98 are stationarily mounted relative to the mounting channel 58 at their lower ends and include upper ends which are slightly biased apart by and receive the free end of the switch arm 72 therebetween.

The adjacent ends of the expansion springs 74 are secured to the free end of the support arm 72 by a suitable fastener 90 secured through one of the longitudinally spaced bores 92 formed in the switch arm 72. In addition, the upper and lower bearings 64 for the shafts 60 are mounted from the upper and lower flanges of the mounting channel 58 through the utilization of fasteners 100 secured through selected longitudinally spaced bores 102 formed in the mounting channel flanges. Further, a pair of upstanding abutment rods 104 are stationarily mounted relative to the channel member 58 and comprise limits of oscillation of the switch arm 72.

Figure 3:
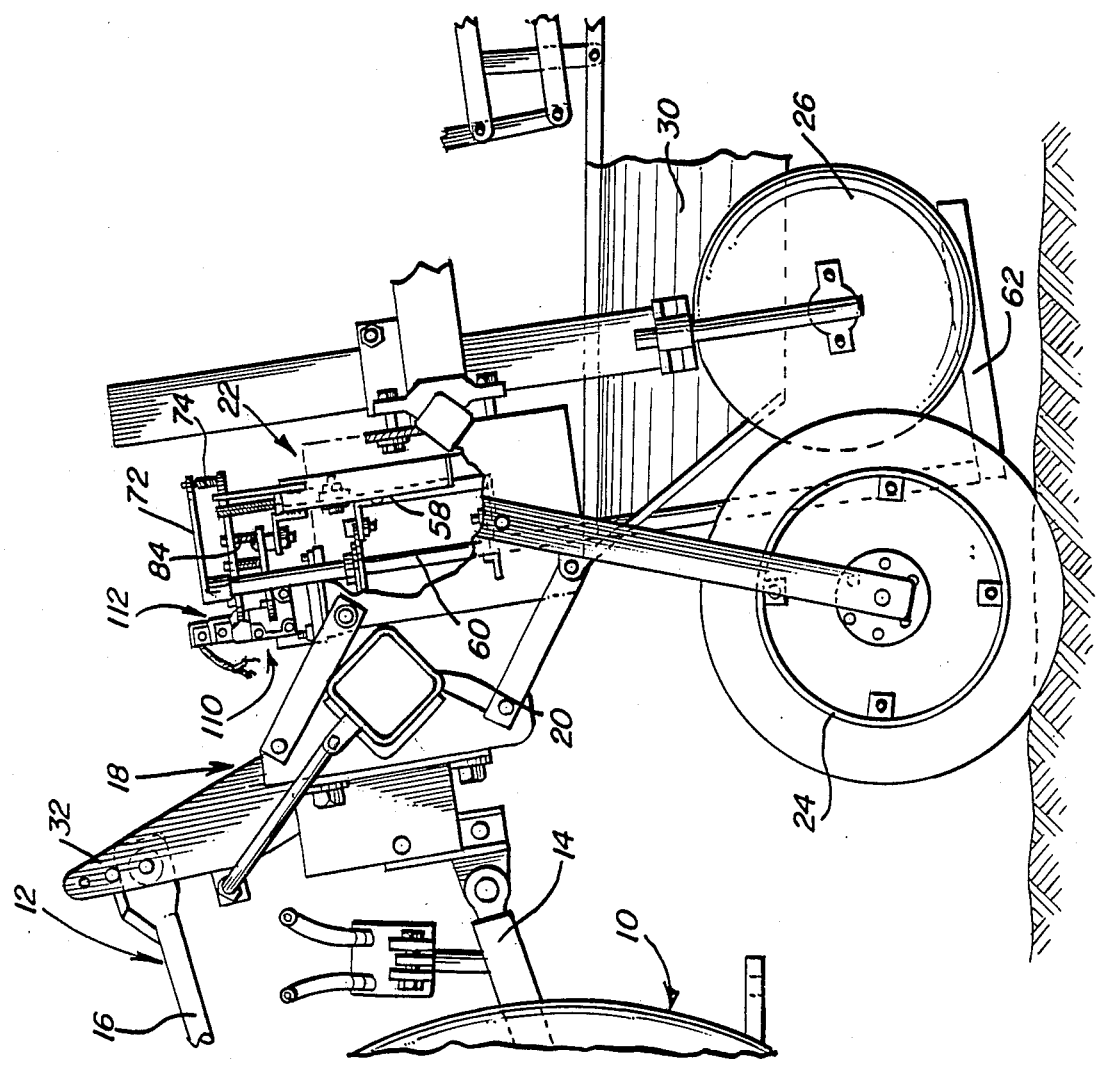
FIG. 3 is an enlarged fragmentary side elevational view of the assemblage illustrated in FIG. 1 as seen from the right side thereof and with portions of the tillage unit being broken away to more clearly illustrate the crop row sensing and control switch operating structure of the guidance system.

Referring now more specifically to FIGS. 3 and 7, there may be seen a hydraulic control valve referred to in general by the reference 100 and a companion pilot valve 112 actuated by an electric switch 114. The control valve comprises a Sperry-Vickers valve Model No. DC588 2C W5G11, the pilot valve comprises a Sperry-Vickers Model No. DG4V36C W5 G12 and the switch 114 comprises a Vesco header switch Model No. 400400-0.

The contact bars or rods 86 and the contact springs 84 are electrically connected to the switch 114 and the control valve 110 is, of course, operatively connected to the hydraulic cylinder 48 and the hydraulic system of the tractor 10.

Assuming that the cultivator unit 22 is in operation, the arms 62 are adapted to closely receive the stalks or stems of row plants therebetween. The spacing between the rear ends of the arms 62 may be adjusted for a particular row crop width by shifting the shafts 60 as a result of the fasteners 100 for the bearings 64 for received through different bores 102, see FIG. 4. In addition, the force by which the rear ends of the arms 62 are yieldingly biased against movement away from each other by the springs 74 may be adjusted by placement of the fastener 90 in a selected one of the bores 92. Still further, the height of the arms 62 above the ground may be adjusted by placement of the pins 68 in selected bores 66.

Once the cultivator unit 22 has been adjusted for a given row crop and is in operation, lateral veering of the tractor 10 will cause the rear end of one of the sensing arms 62 to engage the stems or stalks of the associated row crop and the corresponding shaft 60 will be angularly displaced to swing the associated arm 70 in a direction away from the switch arm 72 in order to swing the switch arm 72 in the same direction whereupon one of the contact bars or rods 86 will engage the corresponding compression spring contact 84 and actuate the control valve 110 to effect operation of the hydraulic cylinder 48. Actuation of the hydraulic cylinder 48 will cause the tool bar 20 to shift relative to the mounting bar 42 in the same direction in which the tractor veered laterally to thus again properly align the shields 30 and units 22 relative to the crop row.

The type of cultivation accomplished by the unit 22 may be referred to as cultivating wherein cultivated earth is laterally displaced from the space between crop rows toward the crop rows in order to pile soil up against the stems or stalks of the plants of the crop row to deter the growth of weeds.

It is important when carrying out this type of cultivation that the crop rows be cultivated as closely as possible without damage being incurred to the roots of the crop row. Accordingly, in the interest of obtaining maximum crop yield, close cultivation of the crop rows may be accomplished without danger to the roots of the crop row.

Although the guidance system of the instant invention has been specifically illustrated and described in connection with the cultivating unit 22, it is important to note that present minimum till planting during the subsequent planting season is carried out by planting the seeds of the subsequent crop centrally along the ridge formed during ridge cultivating of the previous crop. Ridge planting in this manner is extremely difficult since the planter must ride the ridges of the previous crop. The guidance system of the instant invention is also readily adaptable to a tractor hitch full or partially supported ridge planter. However, in this instance the shafts 60 are spaced further apart and the springs 74 are more tightly adjusted to swing the rear ends of the arms 62 apart. In addition, the shafts 60 are downwardly adjusted so that the rear ends of the sensing arm 62 may engage the opposite sides of the lower portion of the ridge being planted. Accordingly, the guidance system is adapted to utilize the stems or stalks of an existing row crop for guidance or the opposite sides of the lower portions of a ridge being planted.

It is also pointed out that the guidance system 46 of the instant invention is readily adaptable to a conventional tool bar-type of cultivating or planting apparatus to be supported from a tractor lift hitch with minimum modification to a cultivating or planting unit. In actuality, only the guide assembly 38 need be mounted from the mounting flanges 36 and the control assembly 56 added to the cultivator or planter unit. The fasteners 40 are passed through existing bores provided in the mounting flange 36 and the mounting bar 42 has its diametrically reduced ends 44 received through the rear ends of the arms 14 in a conventional manner. Thus, modification of a planting or cultivator unit in accordance with the present invention is relatively simple.

Also, it should be noted that the particular manner in which the cultivator unit is modified in accordance with the present invention does not place any undue stresses upon the unit itself or the guide structure 46. The cantilivered suspended weight of the cultivator unit 22 is still supported by the upper arm 16 when the unit 22 is raised out of the ground and the mounting bar 42 comprises the pivot connection between the unit 22 and the rear ends of the arms 14 in substantially the same manner as originally intended for the cultivator 22 with pivot pins (not shown) for the rear ends of the arms 14 being secured through the mounting flanges 36.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a tractor including a longitudinal center line and a lift hitch incorporating a pair of laterally spaced rearwardly projecting lower hitch arms, an elongated horizontal transverse tool bar including a longitudinal mid-portion and opposite end portions, first mounting means mounted to portions of said tool bar spaced longitudinally to either side of said longitudinal mid portion of said tool bar, said first mounting means pivotally mounting said tool bar from the rear ends of said lower arms for angular displacement relative thereto about generally aligned horizontal transverse axes, second mounting means including means operative to variably adjustably longitudinally shift said tool bar along said axes, a depending tillage unit supported from said tool bar, said tillage unit including sensing means for sensing lateral displacement of a row crop to either side of a predetermined path paralleling the longitudinal center line of said tractor and control means operatively associated with said row crop sensing means and said second mounting means operative to longitudinally displace said tool bar relative to said lower arm rear ends in the direction in which said row crop sensing means senses lateral displacement of said crop row laterally of said predetermined path, said row crop sensing means including a pair of laterally spaced depending control shafts mounted from said tool bar for oscillation about upstanding axes, the lower ends of said shafts including horizontally rearwardly directed and convergent plant sensing arms, a horizontal switch arm mounted from said tool bar for oscillation about an upstanding axis, biasing means guidingly biasing said switch arm toward a predetermined central position of oscillation, a pair of control arms generally paralleling said switch arm and carried by the upper ends of said shafts, connecting means connecting the free ends of said control arms to the free end of said switch arm, switch means operatively associated with said switch arm and control means for relatively reversely actuating said control means responsive to opposite angular displacement of said switch arm from said predetermined position, said switch means, including a pair of laterally spaced contact bars extending longitudinally of said switch arm and a pair of upstanding switch contacts having base ends insulatively stationarily mounted from said tool bar and free ends disposed between said contact bars for engagement thereby upon oscillation of said switch arm.

2. The combination of claim 1 wherein said upstanding switch contacts comprise closed coil expansion springs.

3. In combination with a tractor including a longitudinal center line and a lift hitch incorporating a pair of laterally spaced rearwardly projecting lower hitch arms, an elongated transverse mounting bar extending between and having its opposite ends journaled from the rear ends of said lower hitch arms, a guide assembly mounted from said mounting bar for sliding movement therealong and for rotation therewith relative to said lower hitch arms, a horizontal transverse tool bar including a longitudinal mid-portion and opposite end portions and disposed rearward of and generally paralleling said mounting bar, portions of said tool bar spaced longitudinally to either side of said longitudinal mid-portion of said tool bar including mounting structures rigidly mounting said tool bar from said guide assembly, an upstanding attachment arm mounted on said tool bar longitudinal mid-portion between said longitudinally spaced portions, said tractor including a central rearwardly projecting upper lift arm, means pivotally attaching the rear end of said lift arm directly to an upper portion of said attachment arm for angular displacement relative thereto about a horizontal transverse axis, thrust means operatively connected between said mounting bar and said guide assembly for variably adjustably shifting said guide assembly, and thus said tool bar, along said mounting bar, a depending tillage unit supported from said tool bar, said tillage unit including sensing means for sensing lateral displacement of a crop row to either side of a predetermined path paralleling the longitudinal center line of said tractor and control means operatively associated with said crop row sensing means and said thrust means operative to actuate said thrust means to displace said guide assembly along said mounting bar in the direction in which said crop row sensing means senses lateral displacement of said crop row laterally of said predetermined path.

4. The combination of claim 3 wherein said row crop sensing means includes a pair of laterally spaced depending control shafts mounted from said tillage unit for oscillation about upstanding axes, the lower ends of said shafts including horizontally rearwardly directed and convergent plant sensing arms, a horizontal switch arm mounted form said tillage unit for oscillation about an upstanding axis, biasing means guidingly biasing said switch arm toward a predetermined central position of oscillation, a pair of control arms generally paralleling said switch arm and carried by the upper ends of said shafts, connecting means connecting the free ends of said control arms to the free end of said switching arms, and switch means operatively associated with said switch arm and said control means for relatively reversely actuating said control means responsive to angular displacement of said switch arm from said predetermined position.

5. The combination of claim 4 wherein said biasing means includes upstanding closed convolution expansion springs including base end portions stationarily mounted from said tillage unit and free end portions disposed on opposite sides of and engageable by the free end of said switch arm.

6. The combination of claim 4 wherein said depending shafts and said tool bar include coacting means operative to adjustably vertically longitudinally shift said shafts relative to said tool bar.

7. The combination of claim 4 wherein said connecting means includes closed coil expansion springs extending and connecting between said switch arm and said control arms.

8. The combination of claim 7 wherein said biasing means includes upstanding closed convolution expansion springs including base end portions stationarily mounted from said tool bar and free end portions disposed on opposite sides of and engageable by the free end of said switch arm.

9. The tractor and tool bar combination of claim 3 wherein said tool bar includes a plurality of additional tillage units dependently supported therefrom.

* * * * *